(12) United States Patent
McDaniel et al.

(10) Patent No.: US 11,995,365 B2
(45) Date of Patent: May 28, 2024

(54) PRINTING DEVICE ENTRY INTO REDUCED PRINT MATERIAL USAGE MODE

(71) Applicant: Hewlett-Packard Development Company, L.P., Spring, TX (US)

(72) Inventors: Gabriel Scott McDaniel, Boise, ID (US); Scott K. Hymas, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/023,371

(22) PCT Filed: Sep. 30, 2020

(86) PCT No.: PCT/US2020/053390
§ 371 (c)(1),
(2) Date: Feb. 26, 2023

(87) PCT Pub. No.: WO2022/071930
PCT Pub. Date: Apr. 7, 2022

(65) Prior Publication Data
US 2023/0305772 A1  Sep. 28, 2023

(51) Int. Cl.
*G06F 3/12* (2006.01)
*G06K 15/02* (2006.01)

(52) U.S. Cl.
CPC .......... *G06F 3/1239* (2013.01); *G06F 3/1219* (2013.01); *G06K 15/1823* (2013.01)

(58) Field of Classification Search
CPC .. G06F 3/1239; G06F 3/1219; G06F 15/1823; G06F 3/1285; G06F 3/1204; G06F 3/121; G06F 3/1229; G06F 3/1231; G06F 3/1235; G06F 3/1287; G06F 3/0321; G06F 3/03545; G06F 3/0386; G06F 3/1205; G06F 3/1243; G06F 3/1234; G06F 11/3051; G06F 3/0482; G06F 3/1206; G06F 3/1273; G06F 3/1293; B41J 2/17546; B41J 2/17566; B41J 2/1752; B41J 2/17523; B41J 29/38; B41J 29/393; B41J 2/175; B41J 2/17513; B41J 2002/17589; B41J 2/17596; B41J 2/14153; B41J 2/1753; B41J 3/4075; B41J 3/46; B41J 2/1721; B41J 2/17509; B41J 2/17526; B41J 2/18; B41J 2002/1735;
(Continued)

(56) References Cited

U.S. PATENT DOCUMENTS 9,573,807 B1   2/2017  Kaufman et al.
9,715,206 B1 *  7/2017  Luke .................... G03G 15/556
(Continued)

FOREIGN PATENT DOCUMENTS

CN   111061440 A    4/2020
JP   2017-198952 A  11/2017

*Primary Examiner* — Negussie Worku
(74) *Attorney, Agent, or Firm* — Michael Dryja

(57) ABSTRACT

Upon fulfillment of a replacement cartridge of print material, whether projected usage of a printing device will likely deplete a current cartridge of print material prior to anticipated arrival of the replacement cartridge is determined. Responsive to determination that the projected usage will likely deplete the current cartridge prior to the anticipated arrival of the replacement cartridge, the printing device is to enter a reduced print material usage mode during subsequent actual usage of the printing device.

15 Claims, 10 Drawing Sheets

(58) Field of Classification Search
CPC .... B41J 2002/17569; B41J 2002/17573; B41J 2202/20; B41J 29/13; B41J 3/445; B41J 3/50; B41J 11/009; B41J 15/044; B41J 2/1652; B41J 2/17503; B41J 2/17553; B41J 2002/17579; B41J 3/36; B41J 2/155; B41J 2/1707; B41J 2002/14419; B41J 2002/14491; B41J 2202/19; B41J 2/14; B41J 2/17556; B41J 2/17536; B41J 2/16508; B41J 2002/17576; B41J 2/16517; B41J 2/16532; B41J 2/16552; B41J 2/17559; B41J 32/00; B41J 2/14048; B41J 2/16523; B41J 2/17506; B41J 2/19; B41J 2/20; B41J 29/17; B41J 11/0045; B41J 2/04563; B41J 2/04568; B41J 2/04571; B41J 2/135; B41J 2/16526; B41J 2/16535; B41J 2/17543; B41J 2/195; B41J 2/2107; B41J 2/2132; B41J 29/02; B41J 2/01; B41J 2/045; B41J 2/04541; B41J 2/04543; B41J 2/0458; B41J 2/04585; B41J 2/04591; B41J 2/14016; B41J 2/14427; B41J 2/1623; B41J 2/1628; B41J 2/1634; B41J 2/1637; B41J 2/1642; B41J 2/1648; B41J 2/165; B41J 2/16505; B41J 2/17533; B41J 2/1754; B41J 2/515; B41J 2002/14362; B41J 2002/14403; B41J 2002/14435; B41J 2002/14459; B41J 2002/14475; B41J 2002/1742; B41J 2002/17516; B41J 2002/17583; B41J 2202/02; B41J 2202/21; B41J 25/34; G03G 15/553; G03G 15/55; G03G 15/556; G03G 15/5079; G03G 15/01; G03G 15/0856; G03G 15/0863; G03G 15/502; G03G 15/0121; G03G 15/0152; G03G 15/0173; G03G 15/14; G03G 21/00; G03G 21/1857; G03G 2215/0177; G03G 2215/0888; G03G 2221/1657; G03G 21/1889; G03G 15/00; G03G 15/0849; G03G 15/0851; G03G 15/0853; G03G 15/086; G03G 15/0875; G03G 15/0882; G03G 15/0894; G03G 21/0011; G03G 21/0094; G03G 21/02; G03G 21/18; G03G 21/1832; G03G 21/1875; G03G 2215/00569; G03G 2221/1648; G03G 2221/183; G03G 15/08; G03G 15/0865; G03G 15/0872; G03G 15/0877; G03G 15/0886; G03G 21/1647; G03G 21/1676; G03G 21/1842; G03G 21/185; G03G 21/1878; G03G 2215/021; G03G 2215/0668; G03G 2215/0697; G03G 2221/1884; G03G 15/0879; G06K 15/182; G06K 15/4075; G06K 15/022; G06K 15/1868; G06K 15/1885; G06K 15/1889; G06K 19/07718; G06K 19/07749; G06K 15/024; G06K 15/1805; G06K 15/1809; G06K 15/402; G06K 15/105; H04N 1/00015; H04N 1/00034; H04N 1/00061; H04N 1/00068; H04N 1/00079; H04N 1/00082; H04N 1/00323; H04N 1/00344; H04N 1/00954; H04N 1/2346; H04N 1/33315; H04N 2201/0093; H04N 2201/0098; H04N 2201/3212; H04N 2201/3242; H04N 2201/3277; H04N 2201/33378; H04N 1/00411; H04N 1/00413; H04N 2201/0094; H04N 1/00; A61M 2205/3553; A61M 2205/3569; A61M 2205/3389; A61M 2230/005; A61M 2230/201; A61M 5/142; A61M 5/1723; A61M 1/16; A61M 1/3679; A61M 2005/14268; A61M 2005/16863; A61M 2205/18; A61M 2205/3341; A61M 2205/3576; A61M 2205/3584; A61M 2205/8206; A61M 2230/63; A61M 5/1413; A61M 5/14224; A61M 5/14244; A61M 5/168; A61M 5/16831; A61M 5/172; A61M 5/5086; G06Q 10/087; G06Q 10/00; G06Q 50/22; G06Q 10/06; G06Q 10/0875; G06Q 30/016; G06Q 30/0641; G06Q 30/0212; G06Q 30/0236; G06Q 10/083; G06Q 30/0635; G06Q 10/20; G06Q 20/322; Y10T 156/12; Y10T 156/125; Y10T 156/16; H02J 7/00

USPC .................................................... 358/1.13

See application file for complete search history.

(56) References Cited

U.S. PATENT DOCUMENTS

| | | | |
|---|---|---|---|
| 2005/0074246 A1 | 4/2005 | Hayward et al. | |
| 2007/0188530 A1 | 8/2007 | Garrana et al. | |
| 2008/0181625 A1 | 7/2008 | Moodie et al. | |
| 2010/0026742 A1* | 2/2010 | Morino | B41J 2/195 |
| | | | 347/92 |
| 2010/0303481 A1 | 12/2010 | Reitz et al. | |
| 2012/0076510 A1* | 3/2012 | Mizuno | G03G 21/1685 |
| | | | 399/12 |
| 2012/0076516 A1 | 3/2012 | Rapkin et al. | |
| 2012/0076518 A1* | 3/2012 | Rapkin | G03G 15/55 |
| | | | 399/24 |
| 2016/0286059 A1* | 9/2016 | Hitaka | H04N 1/00068 |
| 2016/0292772 A1 | 10/2016 | Nagasaki | |
| 2017/0282586 A1 | 10/2017 | Sasaki et al. | |
| 2018/0005308 A1 | 1/2018 | Ishida et al. | |
| 2018/0370244 A1 | 12/2018 | Dabon et al. | |
| 2019/0299645 A1* | 10/2019 | Miyazawa | B41J 2/17596 |
| 2020/0041944 A1* | 2/2020 | Hiraike | G03G 15/556 |
| 2020/0064767 A1* | 2/2020 | Daque | G06F 3/1285 |
| 2020/0134407 A1* | 4/2020 | Shinagawa | G06K 15/4075 |
| 2020/0361216 A1* | 11/2020 | Tanaka | B41J 2/17509 |
| 2021/0072688 A1* | 3/2021 | Fukuhara | G03G 15/5016 |
| 2021/0077688 A1* | 3/2021 | Bourque | A61M 60/515 |
| 2021/0252869 A1* | 8/2021 | Kishimoto | B41J 2/17523 |
| 2021/0365754 A1* | 11/2021 | Shinagawa | G06K 15/4075 |
| 2022/0121404 A1* | 4/2022 | Esaki | G06F 3/1229 |
| 2023/0234366 A1* | 7/2023 | Kishimoto | G06Q 10/087 |
| | | | 347/86 |

* cited by examiner

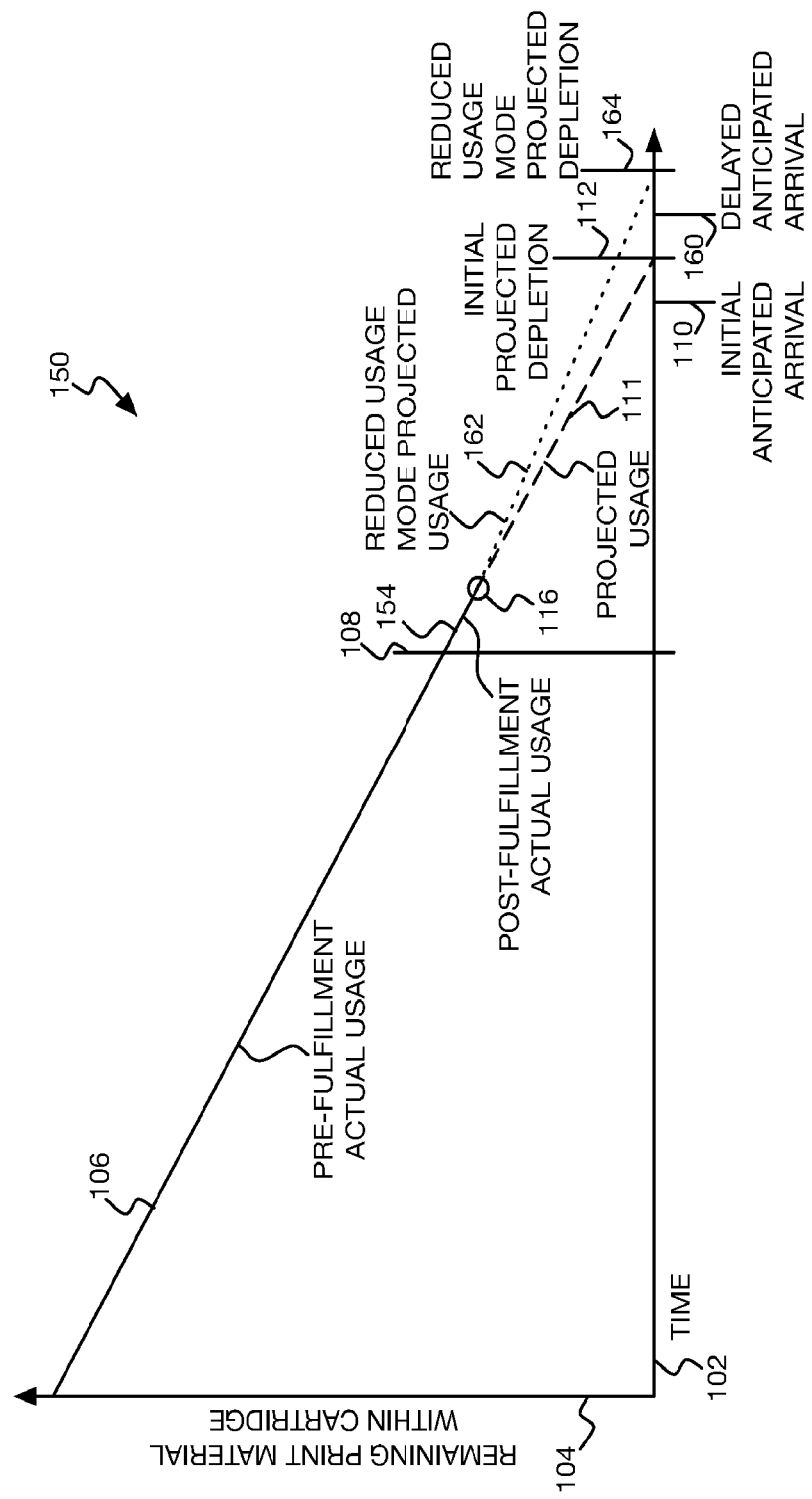

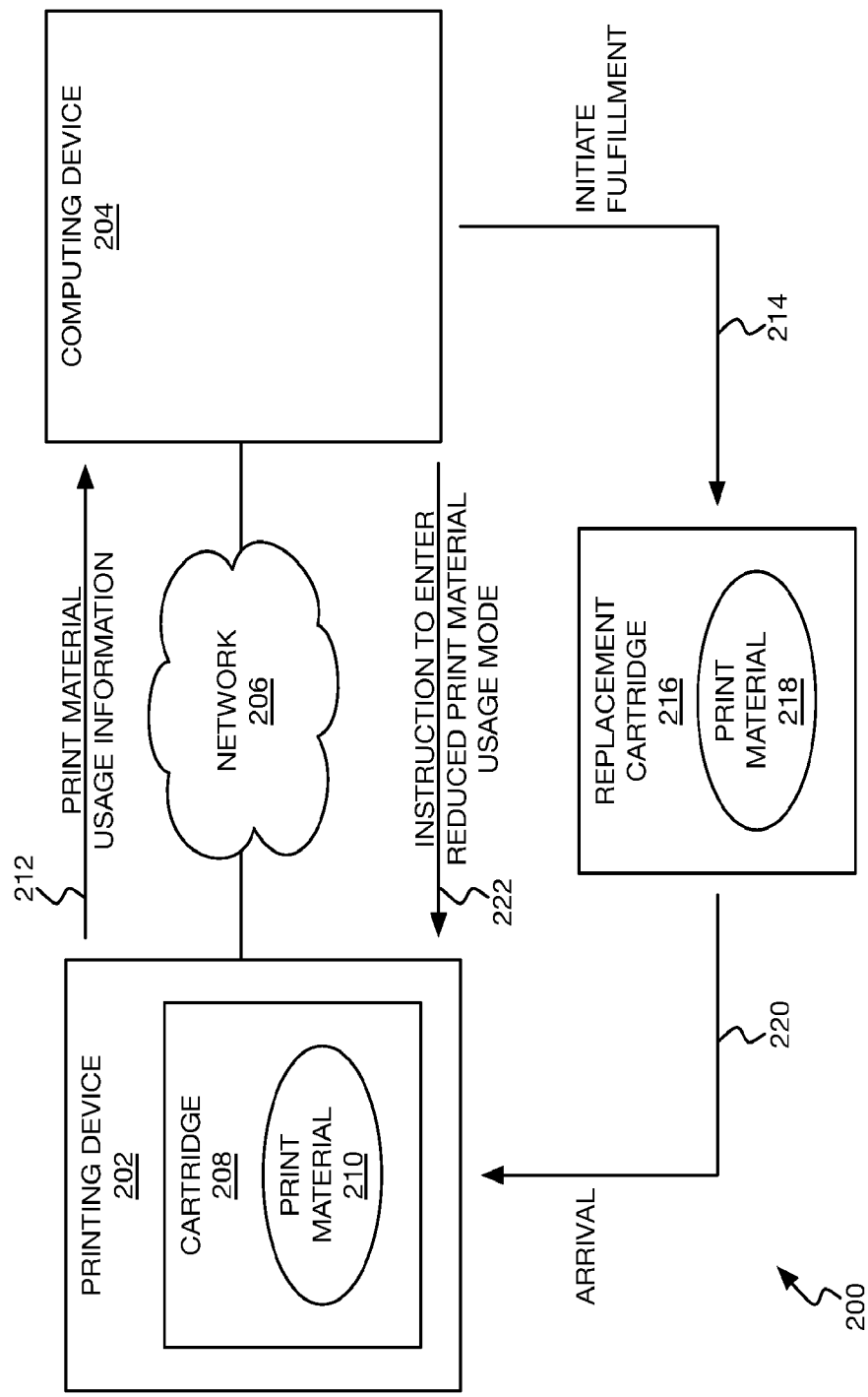

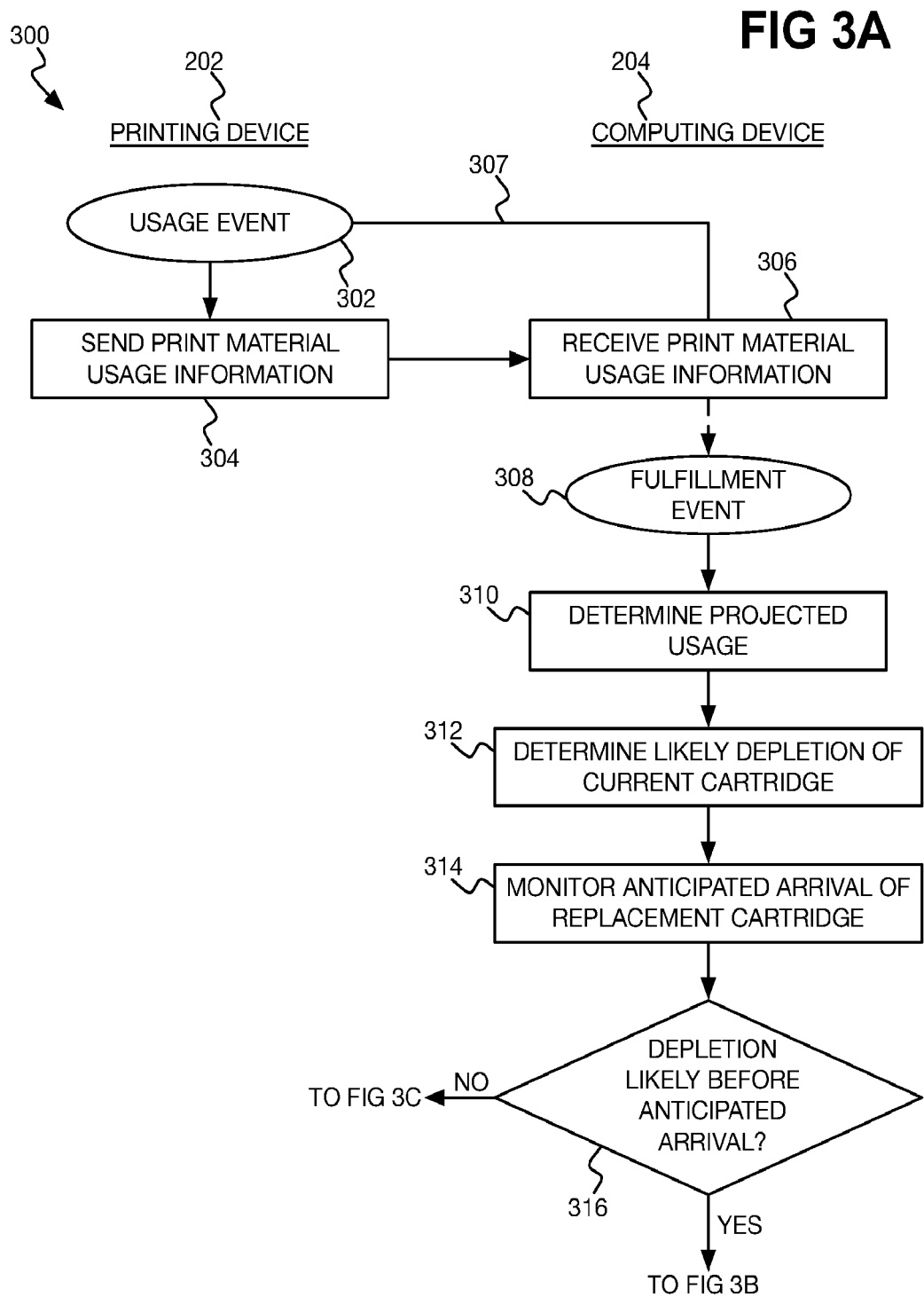

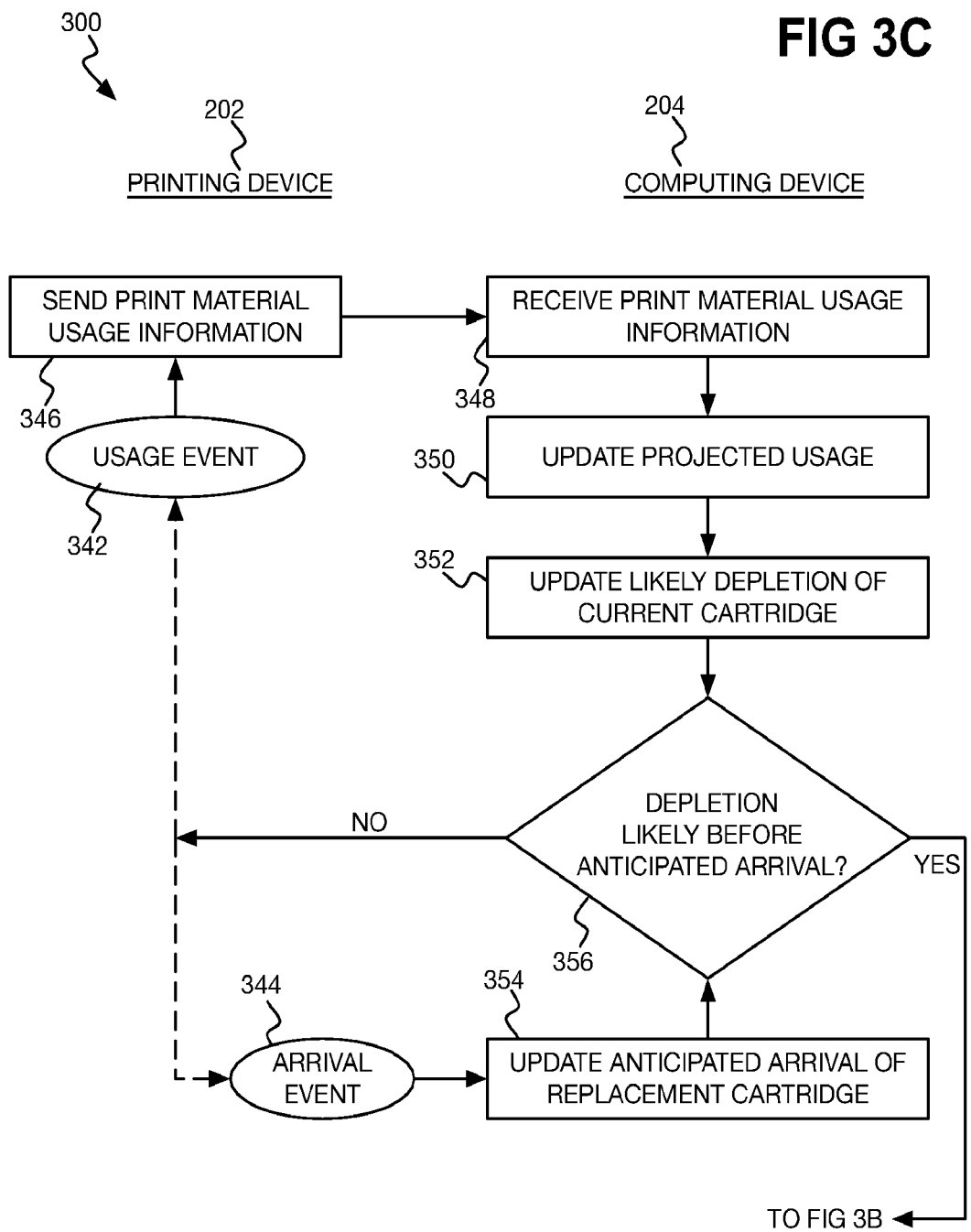

PRINTING DEVICE ENTRY INTO REDUCED PRINT MATERIAL USAGE MODE

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

BRIEF DESCRIPTION OF THE DRAWINGS

FIGS. 1A and 1B are diagrams of two example scenarios in which a printing device enters a reduced print material usage mode to reduce the likelihood that a currently installed print material cartridge will become depleted prior to the arrival of a replacement cartridge.

FIG. 2 is a diagram of an example system for printing device entry into a reduced print material usage mode to reduce the likelihood that a currently installed print material cartridge will become depleted prior to the arrival of a replacement cartridge.

FIGS. 3A, 3B, and 3C are flowcharts of an example method for printing device entry into a reduced print material usage mode to reduce the likelihood that a currently installed print material cartridge will become depleted prior to the arrival of a replacement cartridge.

DETAILED DESCRIPTION

As noted in the background, printing devices deposit print material to form images on media or, in the case of three-dimensional (3D) printing devices, to additively build (3D) objects. A printing device can include a cartridge of print material that the device uses for printing. The term cartridge as used herein includes any type of print material supply that can be connected to or installed within a printing device. As the printing device prints print jobs, print material is consumed from the cartridge. When the cartridge is empty or is running low on print material, the cartridge may be replaced with a replacement cartridge that has a fresh (e.g., full) supply of print material.

The replacement cartridge may be automatically or manually ordered or shipped to an end user or other party responsible for replacing the currently installed cartridge with the replacement cartridge. For example, when the printing device is starting to run low on print material, the device may alert the user, who may then manually order a replacement cartridge. As another example, the printing device may be in communication with a computing device over a network, in accordance with a service that the end user has purchased or to which the end user has subscribed, so that a replacement cartridge is automatically shipped at the appropriate time.

However, the current cartridge may become depleted of print material prior to the arrival of the replacement cartridge. For example, the printing device may be used more frequently for printing, may be used for printing more print jobs, and/or may be used for printing print jobs that consume more print material, resulting in the cartridge becoming empty sooner. As another example, the arrival of the replacement cartridge may become delayed, due to shipment delays or stocking issues. In such instances, the printing device may run out of print material before the replacement cartridge arrives, and therefore unable to print.

Techniques described herein ameliorate these and other issues. Upon fulfillment of a replacement cartridge of print material, it can be determined that projected usage of a printing device will likely deplete the current cartridge of print material prior to the anticipated arrival of the replacement cartridge. In this case, the printing device enters a reduced print material usage mode during subsequent actual printing device usage, to forestall the printing device running out of print material before the replacement cartridge arrives. The printing device uses less print material to print a given print job in the reduced print material usage mode.

Figure 1A:
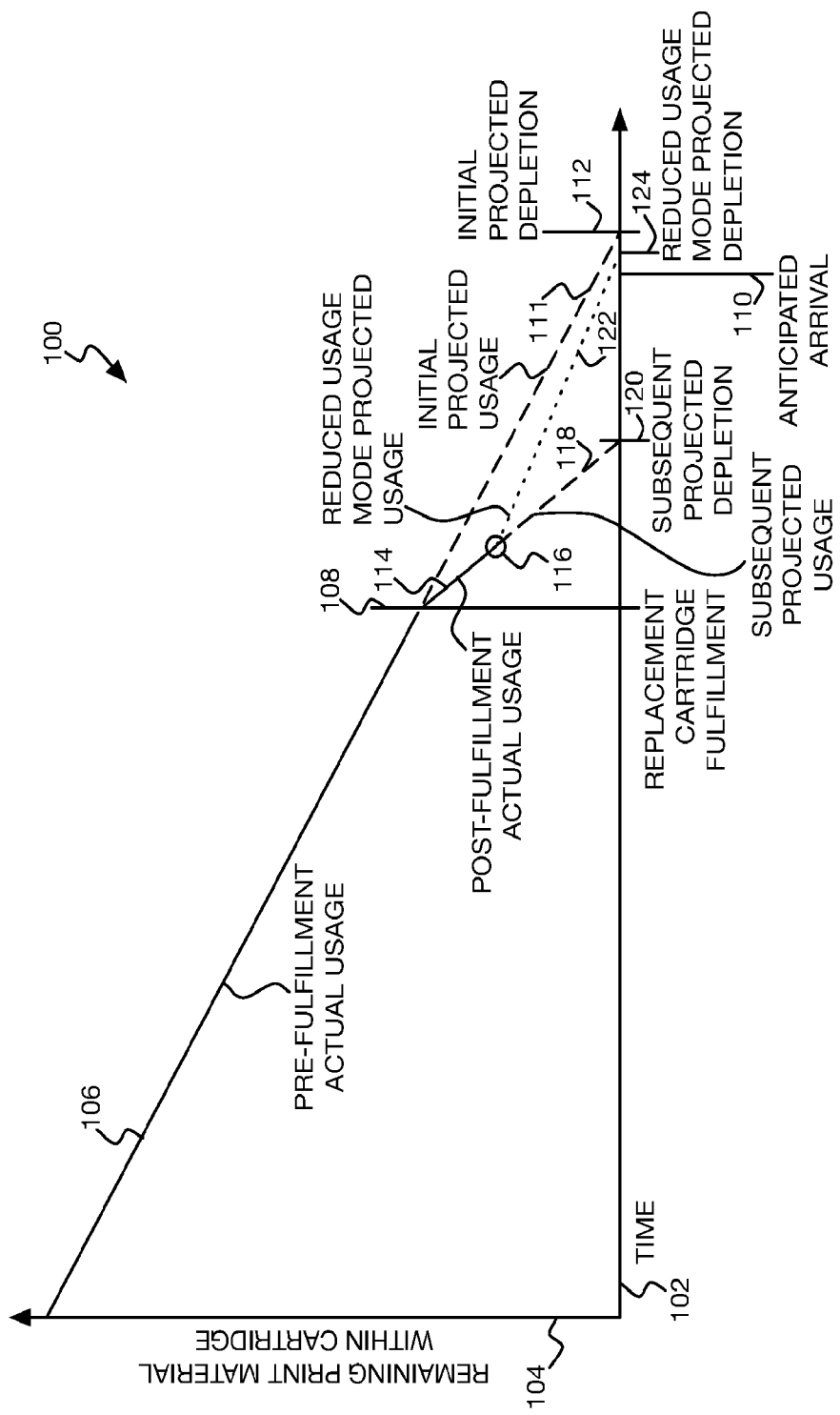

FIGS. 1A and 1B illustrate two example scenarios in which a printing device enters a reduced print material usage mode to reduce the likelihood that a currently installed print material cartridge will become depleted prior to the arrival of a replacement cartridge. Specifically, FIGS. 1A and 1B show graphs 100 and 150, respectively, in which the x-axis 102 denotes time and the y-axis 104 denotes the remaining print material within the currently installed cartridge of the printing device. As the printing device prints print jobs, the remaining print material decreases, such as, in the specific example of FIGS. 1A and 1B, in a linear manner per the solid line 106. More generally, the remaining print material may decrease non-linearly, and may be adjusted upwards as well.

Once the remaining printing material has sufficiently decreased, a replacement cartridge fulfillment event 108 may occur. The event 108 is when fulfillment of the replacement cartridge occurs, such as when shipment of the replacement cartridge has been initiated. For instance, fulfillment may occur when an order for the cartridge has been automatically or manually placed, such as on a regular schedule or once the remaining print material within the current cartridge is deemed to be low. For example, a user may place the order after the printing device has alerted the user that the current cartridge is running low on print material.

As another example, the printing device may be in communication with a computing device over the network. The computing device may automatically initiate fulfillment of the replacement cartridge at an appropriate time, based on (at least) the remaining print material within the cartridge. Fulfillment may not mean that a replacement cartridge has actually been shipped, however, but rather just that shipment has been initiated. For instance, the computing device may transmit a message to a fulfillment center that then arranges for shipment of the replacement cartridge from a particular warehouse. The solid line 106 thus denotes pre-fulfillment actual usage of the print material from the currently installed cartridge.

Upon fulfillment of the replacement cartridge, the time 110 of anticipated arrival of the replacement cartridge may be monitored. At fulfillment, the initial anticipated replacement cartridge arrival may be a projected time (e.g., date) at which the replacement cartridge will arrive at the location of the printing device or another destination specified by the end user or other user responsible for replacing the currently installed cartridge with the replacement cartridge in the device. The anticipated arrival may change throughout the fulfillment process, such as if the replacement cartridge is currently out of stock, when the replacement cartridge is actually shipped, and as shipment delays (if any) occur.

Upon fulfillment of the replacement cartridge, initial post-fulfillment projected usage of the remaining print material from the current cartridge may also be determined, based on the pre-fulfillment actual usage. In the example of FIGS. 1A and 1B, the dashed line 111 denotes such initial post-fulfillment projected usage of the remaining print material in the currently installed cartridge. The time 112 of initial projected depletion of the remaining print material can therefore be determined, which is when the print material is projected to become empty. Usage of the printing device depletes the current cartridge in that usage of the device in printing print jobs causes the device to consume the print material from the cartridge until it becomes empty.

In both FIGS. 1A and 1B, the time 110 of the anticipated arrival of the replacement cartridge initially predates the time 112 of projected depletion of the remaining print material in the current cartridge. This means that by the time 110 the replacement cartridge is anticipated to arrive, the currently installed cartridge will still have remaining print material. That is, by the time 112 the current cartridge becomes empty, the replacement cartridge will likely have already arrived. Therefore, the end user will likely not encounter a situation in which he or she wants to print using the printing device, but the device has no remaining print material in the currently installed cartridge and the replacement cartridge has not yet arrived.

In FIG. 1A, however, post-fulfillment actual usage of the printing device, as denoted by the solid line 114, consumes more of the remaining print material in the current cartridge than had been initially projected (as denoted by the dashed line 111). Subsequent post-fulfillment projected usage of the remaining print material, as denoted by the dashed line 118 in the example of FIG. 1A, may thus be determined responsive to an event 116. The event 116 may be a usage event, such as when post-fulfillment actual print material usage is determined or received. The projected usage may be updated based on the post-fulfillment actual usage. The time 120 of subsequent projected depletion of the remaining print material can therefore be determined. That is, the projected depletion may be updated based on the updated projected usage.

The time 110 of the anticipated arrival of the replacement cartridge now postdates the time 120 of projected depletion of the remaining print material in the current cartridge. This means that before the time 110 the replacement cartridge is anticipated to arrive, the currently installed cartridge is projected to have become depleted of print material. An end user may thus encounter a situation in which he or she wants to print using the printing device, but the device has no remaining print material in the currently installed cartridge and the replacement cartridge has not yet arrived. The techniques described herein decrease the likelihood that this situation will occur.

Specifically, the printing device enters a reduced print material usage mode. In the reduced usage mode, the printing device prints a given print job using less print material than when not operating in the reduced usage mode. For example, a printing device may print in draft mode. As another example, the density at which the printing device outputs print material may be decreased, which may be nearly if not completely imperceptible to the user. Therefore, the remaining print material in the currently installed cartridge can be effectively extended so that the printing device will not run out of print material before the replacement cartridge is anticipated to arrive.

In FIG. 1A, then, starting at the event 116, projected usage while the printing device operates in the reduced print material usage mode, as denoted by the dotted line 122, pushes back the time 124 of projected depletion of the remaining print material. The time 124 of projected depletion of print material in the reduced usage mode now postdates the time 110 of anticipated arrival of the replacement cartridge. Therefore, causing the printing device to enter a reduced print material usage mode reduces the likelihood that an end user will encounter a situation in which he or she wants to print using the printing device, but the device has no remaining print material in the current cartridge and the replacement cartridge has not yet arrived.

In FIG. 1B, by comparison, post-fulfillment actual usage of the printing device, as denoted by the solid line 154, is consistent with the initially projected consumption of the remaining print material in the current cartridge (as denoted by the dashed line 111). However, at the event 116 the time 160 of anticipated arrival of the replacement cartridge has slipped back from the initially anticipated time 110 of arrival. The event 116 in this case may be an arrival event, such as when the anticipated arrival of the replacement cartridge changes. The delayed time 160 of the anticipated arrival now postdates the time 112 of initially projected (and still accurate) depletion of the remaining print material in the current cartridge. Before the time 160 the replacement cartridge is now anticipated to arrive, the currently installed cartridge is thus likely to become empty.

Therefore, the printing device enters a reduced print material usage mode. Starting at the event 116, projected usage while the printing device operates in the reduced print material usage mode, as denoted by dotted line 162, pushes back the time 164 of projected depletion of the remaining print material. The time 164 of projected depletion in the reduced usage mode now again postdates the delayed time 160 of anticipated arrival of the replacement cartridge. Causing the printing device to enter a reduced print material usage mode thus reduces the likelihood that the current cartridge will run out of print material before the replacement cartridge has arrived.

In the example of FIG. 1A, the projected usage of the printing device is likely to deplete the current cartridge prior to the anticipated arrival of the replacement cartridge without printing device entry into a reduced print material usage mode due to projected increased print material consumption. By comparison, in the example of FIG. 1B, the projected usage is likely to deplete the current cartridge prior to anticipated replacement cartridge arrival without entry into a reduced print material usage due to a delay in the anticipated arrival of the replacement cartridge. In other examples, both of these issues—increased print material consumption and anticipated replacement cartridge arrival delay—may occur.

The printing device may remain in a reduced print material usage mode until the current cartridge has been replaced with the replacement cartridge. The printing device may instead remain in a reduced usage mode for a length of time and/or for a number of print jobs that is specified at the time of entry in the reduced usage mode. In a third implementation, the printing device may subsequently exit (and potentially reenter) the reduced print material usage mode, as described later in the detailed description. In a fourth implementation, there may be multiple reduced print material usage modes of increasing aggressiveness in print material usage reduction, as is also described later in the detailed description. These various implementations may be combined as well.

The printing device may enter a reduced usage mode without notifying the end user, and the end user may be prohibited from initiating device exit out of the reduced usage mode, such as if the reduction in print material usage is unlikely to be noticeable. The printing device may instead enter a reduced usage mode after having notified and having received approval from the end user, such as if the reduction in print material usage is more aggressive and more likely to be noticeable. The printing device or a computing device to which the printing device is communicatively connected may cause the printing device to enter a reduced print material usage mode. A specific implementation of the latter is described next.

FIG. 2 shows an example system 200 for printing device entry into a reduced print material usage mode to reduce the likelihood that currently installed print material cartridge depletion will occur prior to replacement cartridge arrival. The system 200 includes a printing device 202 and a computing device 204. The printing device 202 may be a standalone printer or an all-in-one (AIO) device that combines printing functionality with other functionality, such as scanning functionality. The computing device 204 may be a server, such as a cloud computing server, or another type of computing device. The printing device 202 and the computing device 204 are communicatively connected to one another over to a network 206, such as wired or wireless networks, intranets, extranets, the Internet, and so on.

As depicted in FIG. 2, the printing device 202 may be directly connected to the network 206 without an intermediary host computing device like a desktop or laptop computer. For instance, the printing device 202 may include a wired network port, such as an Ethernet port, and/or may have wireless communication capability, such as Wi-Fi or another type of wireless local area network (WLAN) communication capability. In another implementation, however, the printing device 202 may be communicatively connected to a host computing device, such as via a universal serial bus (USB) wired connection or a Bluetooth wireless connection. In such an implementation, the host computing device is communicatively connected to the network 206, and the printing device 202 communicates over the network 206 through the host computing device.

The printing device 202 includes a cartridge 208 of print material 210 that the device 202 uses when printing jobs. The term cartridge as used herein includes any type of print material supply that can be connected to or installed within the printing device 202. For example, the cartridge may be a toner or an inkjet cartridge. As the printing device 202 prints print jobs, the device 202 can send (212) print material usage information for each print job to the computing device 204. The print material usage information specifies the (predicted or actual) print material usage of the job, and/or other information from which the usage may be determined. Such other information may include the print job itself, information regarding the job, identifying information of the cartridge 208 and the device 202, historical usage information, and so on.

The printing device 202 can send the print material usage information periodically in batches, for multiple print jobs that have been printed, or individually as each print job is printed. For example, the information may be sent each time a usage event occurs. A usage event may be triggered each time a print job is printed or after a specified number of jobs have been printed. A usage event may additionally or instead be temporally triggered, such as one or multiple times a day, and so on. A usage event may also be triggered at each opening and subsequent closure of a cover of the printing device behind which the currently installed cartridge 210 is accessible.

At the appropriate time, the computing device 204 can initiate fulfillment (212) of a replacement cartridge 216 of print material 218 for arrival (220). For example, such a fulfillment event may be initiated based on a determination of when the remaining print material 210 within the current cartridge 208 is likely to become depleted and when the arrival of the replacement cartridge 216 would likely arrive, so that the cartridge 216 is likely to arrive before the current cartridge 208 becomes empty. Fulfillment may be initiated so that the replacement cartridge 216 does not arrive too soon, which can permit premature replacement of the cartridge 208 with the cartridge 216 and thus unduly waste the remaining print material 210 within the cartridge 208.

Upon fulfillment of the replacement cartridge 216 the computing device 204 may, however, determine that the projected usage of the printing device 202 will likely deplete the current cartridge 208 of print material 210 prior to the anticipated arrival of the replacement cartridge 216. Responsive to this determination, the computing device 204 sends (222) an instruction to the printing device 202 to cause the device 202 to enter a reduced print material usage mode during subsequent actual usage of the device 202. Entry and operation of the printing device 202 into the reduced print material usage mode reduces the likelihood that the current cartridge 208 will become depleted prior to the arrival of the replacement cartridge 216.

At the fulfillment event, the projected usage of the printing device 202 may not likely deplete the current cartridge 208 of print material 210 prior to the anticipated arrival of the replacement cartridge 216. Rather, at a subsequently occurring usage event, the projected usage of the printing device 202 may be updated and at that time likely deplete the current cartridge 208 prior to the anticipated arrival of the replacement cartridge 216. Similarly, at a subsequently occurring arrival event, the anticipated arrival of the replacement cartridge 216 may be delayed such that the projected usage may at that time likely deplete the current cartridge 208 prior to the updated anticipated arrival of the replacement cartridge 216.

Figure 3B:
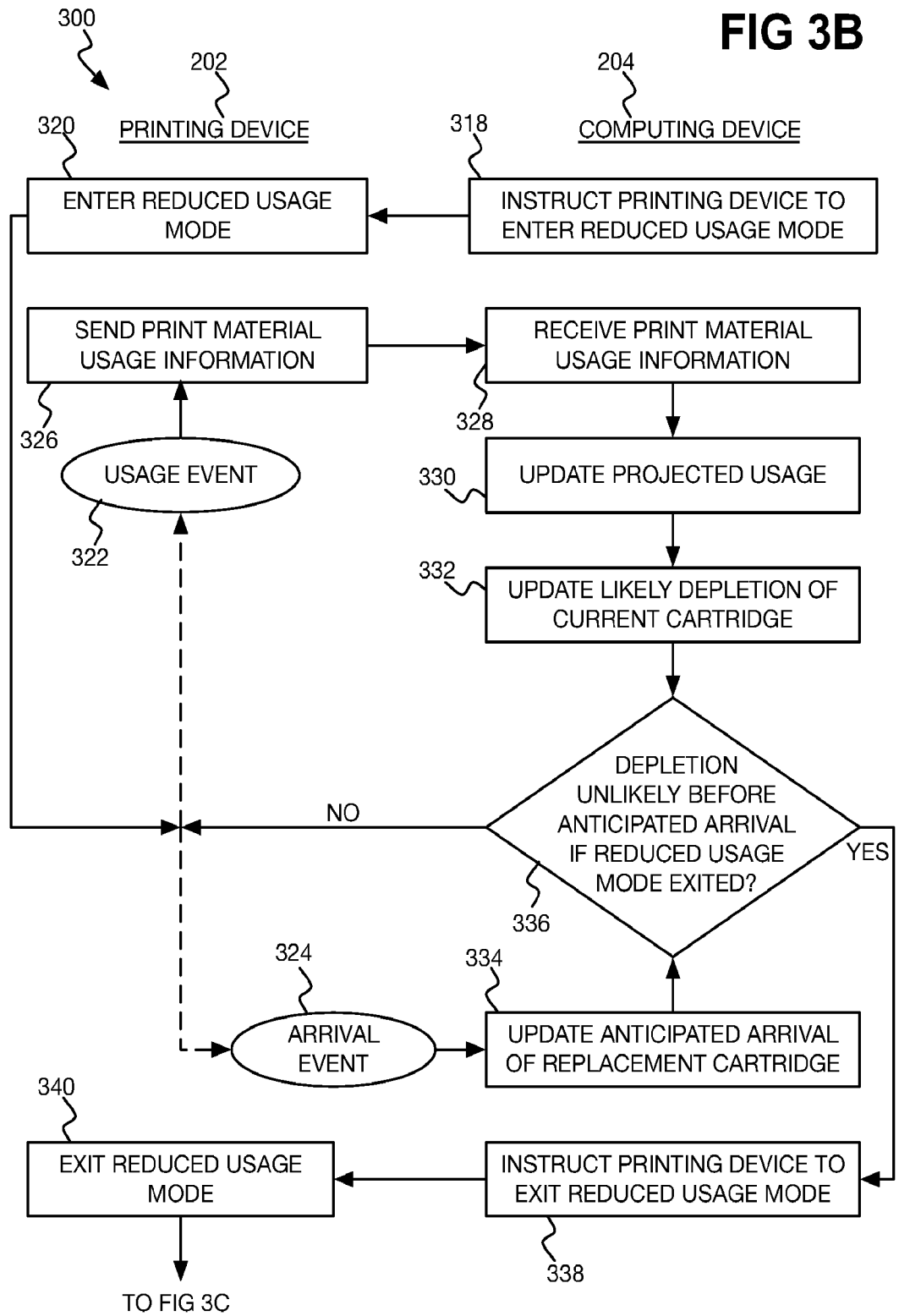

FIGS. 3A, 3B, and 3C shows an example method 300 for printing device entry into a reduced print material usage mode to reduce the likelihood that a currently installed print material cartridge will become depleted prior to the arrival of a replacement cartridge. In the method 300, the printing device may exit and reenter the reduced print material usage mode. The method 300 is described in relation to the printing device 202 and the computing device 204 of FIG. 2, which respectively perform the left and right columns of the method 300. The method 300 can be implemented as program code stored on a non-transitory computer-readable data storage medium and executed by respective processors of the devices 202 and 204.

In FIG. 3A, when a usage event occurs (302), the printing device 202 can send print material usage information regarding one or multiple print jobs that have or will be printed to the computing device 204 (304), which receives this information (306). This process is repeated as usage events occur at the printing device (307). At some point a fulfillment event occurs (308), corresponding to fulfillment of a replacement cartridge 216 for the printing device 202. Upon occurrence of the fulfillment event (e.g., such as in response to the fulfillment event or after the fulfillment event has occurred), the computing device 204 can determine projected usage of the remaining print material 210 within the current cartridge 208 of the printing device 202 (310), based on the previously received print material usage information.

The computing device 204 can further determine the likely time of depletion of the currently installed cartridge 208 (312), based on the projected usage of the printing device 202 in using the remaining print material 210 within the cartridge 208. The computing device 204 can also monitor the anticipated arrival of the replacement cartridge 216 (314), the fulfillment of which the occurred fulfillment event concerns. If the computing device 204 determines that the projected usage will likely deplete the current cartridge 208 prior to the anticipated arrival of the replacement cartridge 216 (316), then the method 300 proceeds to FIG. 3B, and otherwise proceeds to FIG. 3C.

In FIG. 3B, the computing device 204 has thus determined that the projected usage of the printing device 202 will likely deplete the current cartridge 208 of print material 210 before the replacement cartridge 216 of print material 218 is anticipated to arrived. The computing device 204 therefore instructs the printing device 202 to enter a reduced print material usage mode (318), and the printing device 202 responsively enters the reduced usage mode (320). The method 300 continues with the occurrence of a usage event (322) or the occurrence of an arrival event (324). Generally, the computing device 204 continually updates the projected usage of the printing device 202 and continually monitors the anticipated arrival of the replacement cartridge 216 in response to occurrence of the usage and arrival events, respectively.

In the case of a usage event, the printing device 202 sends print material usage information to the computing device 204 (326), which responsively receives this information (328), as before. The computing device 204 updates the projected usage of the remaining print material 210 within the current cartridge 208 of the printing device 202 (330), such as based on the more recently received print material usage information, and accordingly updates the likely time of depletion of the current cartridge 208 (332). In the case of an arrival event, the computing device 204 updates the anticipated arrival of the replacement cartridge 216 (334). An arrival event may occur when updated arrival information regarding the replacement cartridge 216 is received from the party responsible for logistics, shipment, or delivery of the cartridge 216 (e.g., as tracking information is received).

In either case, if the computing device 204 determines that the projected usage will no longer likely deplete the current cartridge 208 prior to the anticipated arrival of the replacement cartridge 216 if the printing device 202 were to exit the reduced usage mode (336), the computing device 204 can instruct the printing device 202 to exit the reduced usage mode (338). The printing device 202 accordingly exits the reduced print material usage model (340), and the method 300 proceeds to FIG. 3C. However, if the computing device 204 determines that the current cartridge 208 will still likely deplete the current cartridge 208 prior to the anticipated arrival of the replacement cartridge 216 if the reduced print material usage mode were exited (336), then FIG. 3B is repeated with the occurrence of the next usage event (322) or arrival event (324).

In FIG. 3C, the printing device 202 has, post-fulfillment event occurrence, not yet entered the print material usage mode if proceeding to FIG. 3C from FIG. 3A, or has exited the reduced print material usage mode if proceeding to FIG. 3C from FIG. 3B. The method 300 continues in FIG. 3C with the occurrence of a usage event (342) or the occurrence of an arrival event (344). As before, generally the computing device 204 continually updates the projected usage of the printing device 202 and continually monitors the anticipated arrival of the replacement cartridge 216 in response to occurrence of the usage and arrival events, respectively.

In the case of a usage event, the printing device 202 sends print material usage information to the computing device 204 (346), which responsively receives this information (348), as before. The computing device 204 updates the projected usage of the remaining print material 210 within the current cartridge 208 of the printing device 202 (350), such as based on the more recently received print material usage information, and accordingly updates the likely time of depletion of the current cartridge 208 (352). In the case of an arrival event, the computing device 204 updates the anticipated arrival of the replacement cartridge 216 (354).

In either case, if the computing device 204 determines that the projected usage will likely deplete the current cartridge 208 prior to the anticipated arrival of the replacement cartridge 216 (336), the method 300 proceeds to FIG. 3B. As described, the printing device 202 will then be instructed by the computing device 204 to enter and will responsively enter the reduced print material usage mode. If the computing device 204 determines that the current cartridge 208 will not likely deplete the current cartridge 208 prior to the anticipated arrival of the replacement cartridge 216, then FIG. 3C is repeated with the occurrence of the next usage event (342) or arrival event (344).

In the method 300 of FIGS. 3A, 3B, and 3C, the printing device 202 may enter and exit a reduced print material usage mode as the projected usage of the printing device 202 and the anticipated arrival of the replacement cartridge 216 are updated. Once the printing device 202 has entered the reduced usage mode, subsequent determination that the projected usage will likely not deplete the current cartridge 208 prior to the arrival of the replacement cartridge 216 if the device 202 exited the reduced usage mode causes the printing device 202 to exit the reduced mode. If the printing device 202 is not in the reduced usage mode, subsequent determination that the projected usage will likely deplete the current cartridge 208 prior to the arrival of the replacement cartridge 216 causes the printing device 202 to enter the reduced usage mode.

Figure 4:
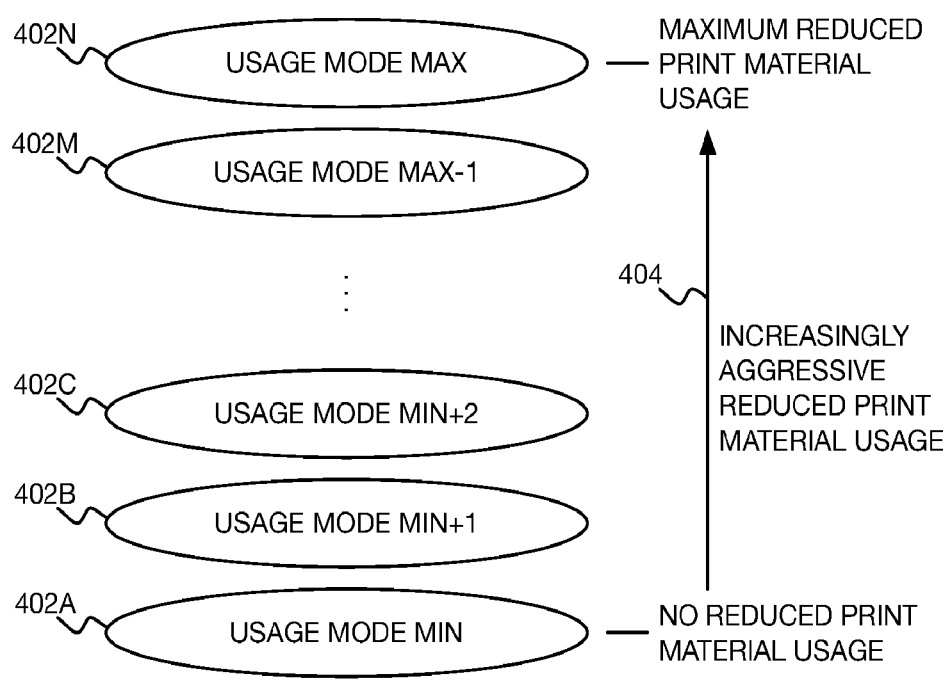
FIG. 4 is a diagram of example print material usage modes, including multiple reduced print material usage modes of varying aggressiveness.

FIG. 4 shows an example of multiple print material usage modes 402A, 402B, 402C, . . . , 402M, 402N, which are collectively referred to as the print material usage modes 402, and where the number of usage modes 402 does not have to be equal to N. The print material usage modes 402 span, per arrow 404, from a usage mode MIN 402A in which print jobs are printed without any reduction in print material usage, through reduced usage modes MIN+1 402B, MIN+2 402C, . . . , MAX−1 402M in increasingly aggressive reduction in print material usage, to a reduced usage mode MAX 402N. Maximum, or most aggressive, reduction in print material usage when printing print jobs thus occurs in the reduced print material usage mode MAX 402N.

For example, a printing device may have a density setting that controls the density of print material output for a pixel of a print job. Therefore, for a given print job, more print material will be used when printing the print job at a higher density as compared to when printing the job at a lower density. The printing device may be initially set to a given density value for normal operation, to which the print material usage mode MIN 402A corresponds. Each subsequent print material usage mode 402B, 402C, . . . , 402M, 402N may thus correspond to a successively lower density value to provide further reduction in print material usage.

Figure 5:
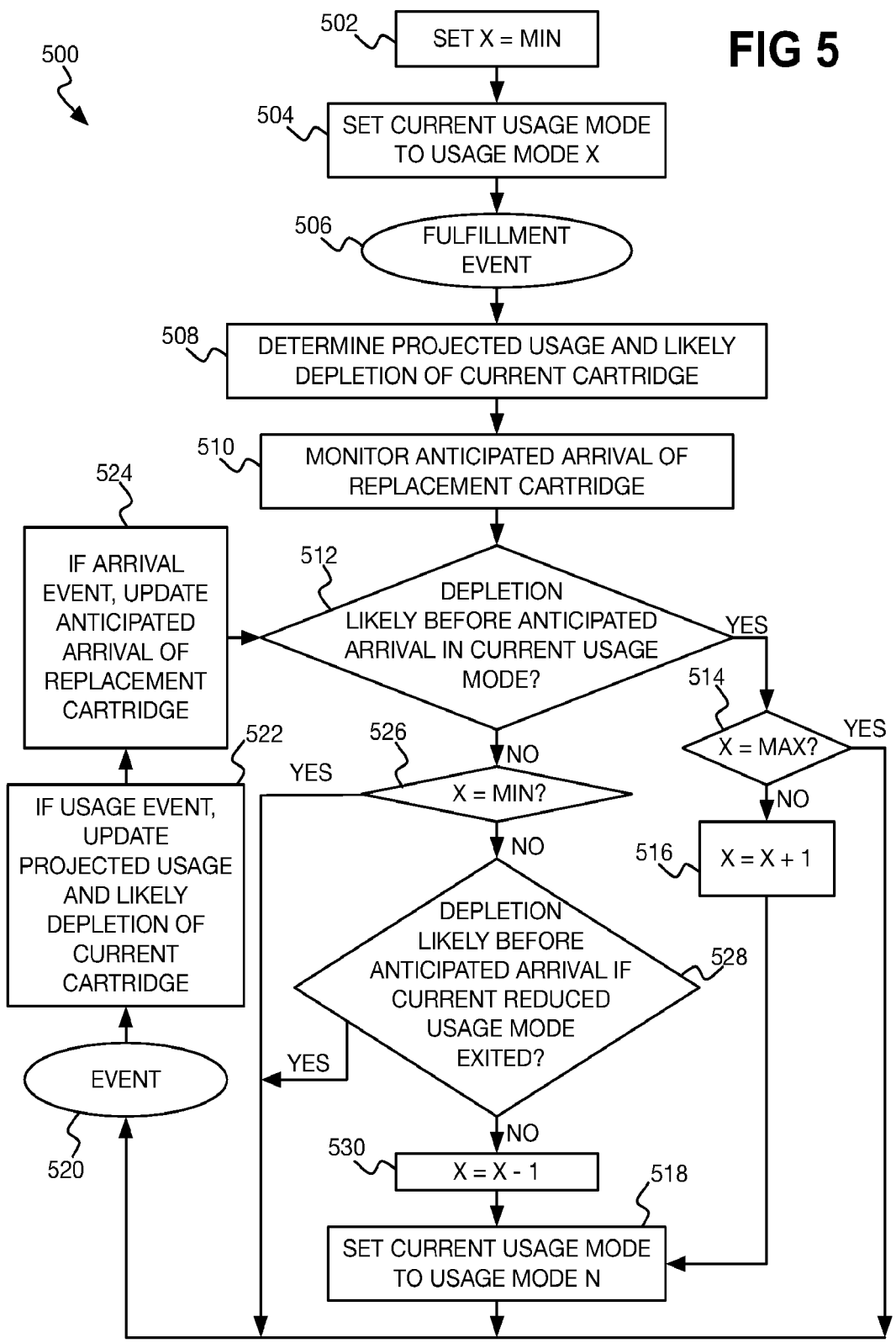
FIG. 5 is a flowchart of an example method for printing device entry into increasingly aggressive reduced print material usage modes to reduce the likelihood that a currently installed print material cartridge will become depleted prior to the arrival of a replacement cartridge.

FIG. 5 shows an example method 500 for printing device entry into increasingly aggressive reduced print material usage modes to reduce the likelihood that a currently installed print material cartridge will become depleted prior to the arrival of a replacement cartridge. The method 500 is described in relation to the printing device 202 of FIG. 2 and the print material usage modes 402 of FIG. 4. The printing device 202 and/or the computing device 204 may perform the method 500, which can be implemented as program code stored on a non-transitory computer-readable data storage medium and executed by respective processor(s) of the device(s) 202 and 204.

The method 500 includes setting a print material usage mode pointer X to the print material usage mode MIN 402A (502), in which no print material reduction occurs. The method 500 includes setting the current print material usage mode of the printing device 202 to the print material usage mode identified by the usage mode pointer X (504). The method 500 includes, upon the occurrence of a fulfillment event (506), determining the projected usage of the remaining print material 210 within the current cartridge 208 of the printing device and the time of likely depletion of the cartridge 208 (508), as before. Also as before, the method 500 includes monitoring the anticipated arrival of the replacement cartridge 216 (510).

If the projected usage in the current usage mode will likely deplete the current cartridge 208 prior to the arrival of the replacement cartridge 216 (512), and the usage mode pointer X does not reference the reduced print material usage mode MAX 402N (514), the method 500 includes then incrementing the usage mode pointer X to reference the next reduced usage mode 402 (516). For example, if the usage mode pointer X references the usage mode MIN 402A, then the usage mode pointer X is incremented to reference the reduced usage mode MIN+1 402B, and if the pointer X references the mode MIN+1 402B, then the pointer X is increment to reference the mode MIN+2 402C, and so on. The method 500 includes then setting the current print material usage mode of the printing device 202 to the usage mode identified by the usage mode pointer X (518).

The method 500 continues with the occurrence of a usage or arrival event (520). If the event is a usage event, the method 500 includes updating the projected usage of the printing device 202 in using the remaining print material 210 from the current cartridge 208 and when likely depletion of the cartridge 208 will occur (522). By comparison, if the event is an arrival event, the method 500 includes updating the anticipated arrival of the replacement cartridge 216 (524). The method 500 then proceeds back to determining whether projected usage in the current usage mode will likely deplete the currently installed cartridge 208 before the anticipated arrival of the replacement cartridge 216 (512).

If the projected usage in the current usage mode will not likely deplete the cartridge 208 prior to arrival of the cartridge 216 (512), if the pointer X does not reference the usage mode MIN 402A (526), and if depletion is not likely before the anticipated arrival if the current usage mode were exited (528), the method 500 includes decrementing the pointer X to reference the preceding usage mode 402 (530). For example, if the pointer X references the usage mode MAX 402N, then the pointer X is decremented to reference the usage mode MAX−1 402M, and if the pointer X references the mode MIN+2 402C, then the pointer X is decremented to reference the mode MIN+1 402B, and so on. The method 500 includes then setting the current usage mode of the printing device 202 to the usage mode identified by the pointer X (518), as before, and the method 300 continues with the occurrence of an event (520), as described.

Once the current print material usage mode of the printing device 202 is set to the print material usage mode MIN 402A, there may be no preceding print material usage mode in which the device 202 can use more print material for a given print job. In this case, the method 500 proceeds from part 526 to part 520, because the pointer X references the usage mode MIN 402A. Similarly, once the current print material usage mode is set to the print material usage mode MAX 402N, there may be no further print material usage mode in which the device 202 can use even less print material for a given print job. In this case, the method 500 proceeds from part 514 to part 520, because the pointer X references the usage mode MAX 402N.

In the method 500 of FIG. 5, the printing device 202 may thus enter more aggressive or less aggressive reduced print material usage modes 402 as the projected usage of the printing device 202 and/or the anticipated arrival of the replacement cartridge 216 are updated. As has been described, for example, once the printing device 202 has entered the reduced print material usage mode MIN+1 402B, a subsequent determination may occur that projected usage will still likely deplete the current cartridge 208 prior to the arrival of the replacement cartridge 216. Therefore, such a determination responsively causes the printing device 202 to enter the more aggressive reduced print material usage mode MIN+2 402C.

Figure 6:
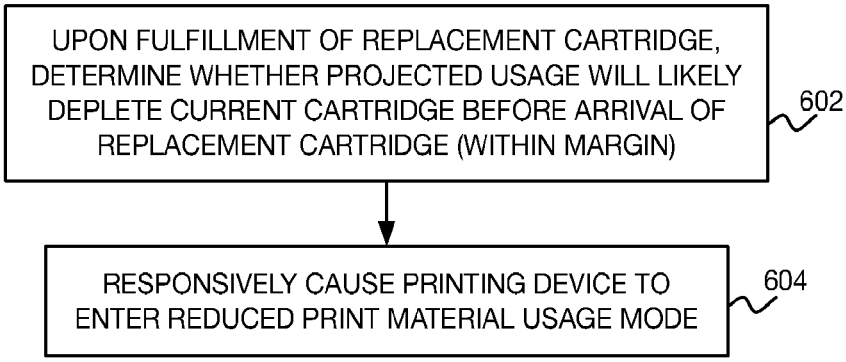
FIG. 6 is a flowchart of an example method.

FIG. 6 shows an example method 600. The method 600 can be performed by a processor, which may be part of a printing device or a computing device that is communicatively connected to the printing device over a network. The method 600 includes upon fulfillment of a replacement cartridge of print material, determining whether projected usage of the printing device will likely deplete a current cartridge of print material prior to anticipated arrival of the replacement cartridge (602). The method 600 includes, responsive to determination that the projected usage will likely deplete the current cartridge prior to the anticipated arrival of the replacement cartridge, causing the printing device to enter a reduced print material usage mode during subsequent actual usage of the printing device (604).

Figure 7:
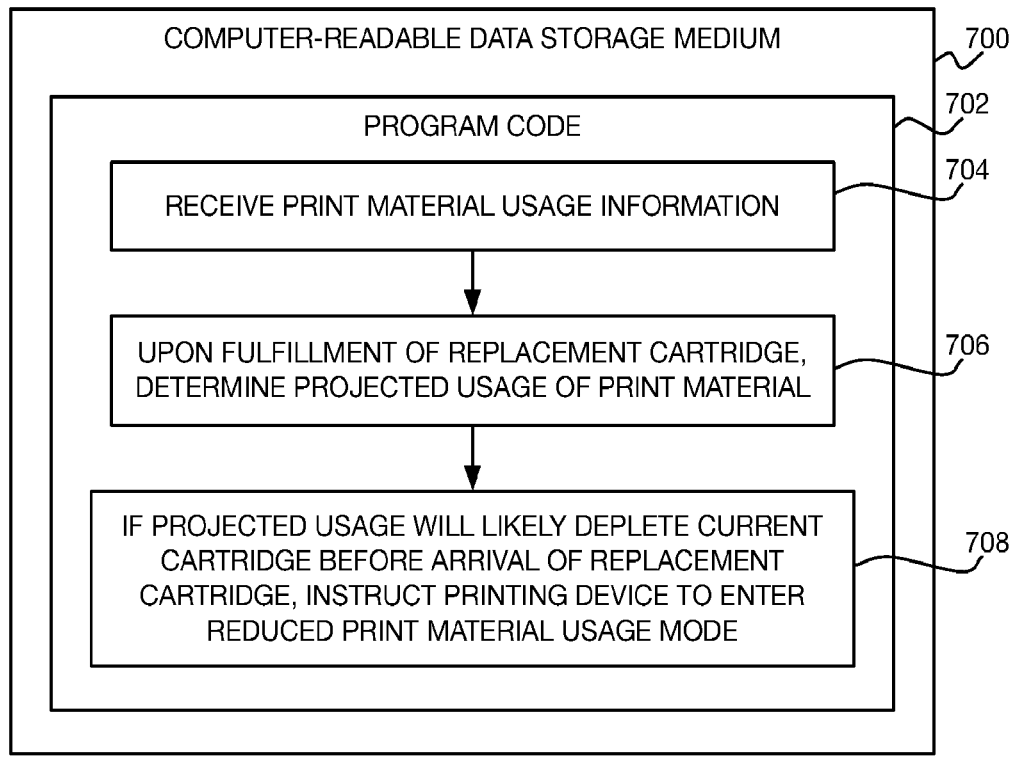
FIG. 7 is a diagram of an example non-transitory computer-readable data storage medium.

FIG. 7 shows an example non-transitory computer-readable data storage medium 700 storing program code 702 executable by a processor to perform processing. The processor may be part of a computing device communicatively coupled to a printing device over a network. The processing includes, as a printing device prints print jobs using print material from a current cartridge, receiving print material usage information regarding the print jobs (704). The processing includes, upon fulfillment of a replacement cartridge of print material, determining projected usage of the print material from the current cartridge, based on the received print material usage information (706). The processing includes, responsive to determining that the projected usage will likely deplete the current cartridge prior to anticipated arrival of the replacement cartridge, instructing the printing device to enter a reduced print material usage mode in printing subsequent print jobs (708).

Figure 8:
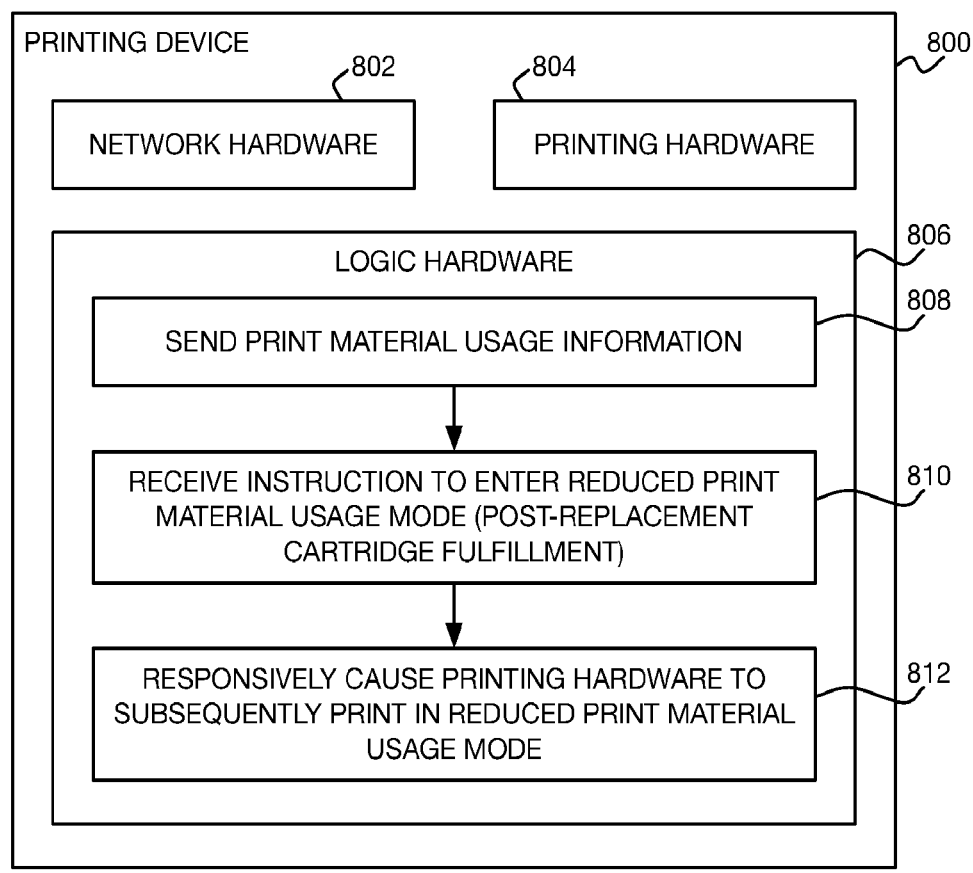
FIG. 8 is a block diagram of an example printing device.

FIG. 8 shows an example printing device 800. The printing device 800 includes network hardware 802 to communicatively connect to a computing device over a network. The printing device 800 includes printing hardware 804 to print a print job on print media using print material from a cartridge. For instance, the printing hardware 804 may include laser-printing hardware components such as a photoconductive drum, an optical beam source, a fuser, and so on, or may include inkjet-printing hardware components such as an inkjet printhead.

The printing device 800 includes logic hardware 806. The logic hardware 806 may be or include a processor and a non-transitory computer-readable data storage medium storing program code executable by the processor. The processor and the medium may be discrete components as is the case with a general-purpose processor and a memory, or may be integrated as one component as is the case with an application-specific integrated circuit (ASIC).

The logic hardware 806 sends print material usage information regarding the print jobs to the computing device. The logic hardware 806 receives instruction from the computing device to enter a reduced print material usage mode, responsive to post-replacement cartridge fulfillment determination that projected usage will likely deplete the current cartridge prior to anticipated arrival of a replacement cartridge. The logic hardware 806 responsively causes the printing hardware to print subsequent print jobs in the reduced print material usage mode.

Techniques have been described for printing device entry into a reduced print material usage mode to reduce the likelihood that a currently installed cartridge will become depleted of print material before a replacement cartridge has arrived. If upon replacement cartridge fulfillment, the anticipated arrival date of the replacement cartridge becomes delayed, printing print jobs in the reduced usage mode can thus ensure that the remaining print material in the current cartridge will not run out before the replacement cartridge arrives. Similarly, if upon replacement cartridge fulfillment, the projected usage of the printing device portends increased print material consumption, printing print jobs in the reduced usage mode can ensure that the remaining print material in the current cartridge will not run out before the replacement cartridge arrives.

We claim:

1. A method comprising:
    upon fulfillment of a replacement cartridge of print material that is to replace a current cartridge of print material in a printing device, determining, by a processor, whether projected usage of the printing device in the future will likely deplete the current cartridge prior to anticipated arrival of the replacement cartridge such that the replacement cartridge will likely not have arrived and be unavailable to replace the current cartridge in the printing device when the current cartridge is depleted; and
    responsive to determination that the projected usage will likely deplete the current cartridge prior to the anticipated arrival of the replacement cartridge, causing, by the processor, the printing device to enter a reduced print material usage mode during subsequent actual usage of the printing device to use less print material from the current cartridge during the subsequent actual usage to reduce a likelihood that the current cartridge will be depleted before the replacement cartridge does arrive.

2. The method of claim 1, wherein the replacement cartridge is fulfilled in that shipment of the replacement cartridge is initiated.

3. The method of claim 1, wherein usage of the printing device depletes the current cartridge in that the usage of the printing device in printing print jobs causes the printing device to consume the print material from the current cartridge until the cartridge becomes empty.

4. The method of claim 1, wherein the projected usage of the printing device will likely deplete the current cartridge prior to the anticipated arrival of the replacement cartridge due to projected increased print material consumption.

5. The method of claim 1, wherein the projected usage of the printing device will likely deplete the current cartridge prior to the anticipated arrival of the replacement cartridge due to a delay in the anticipated arrival of the replacement cartridge.

6. The method of claim 1, further comprising, after the printing device has entered the reduced print material usage mode:
    determining, by the processor, whether the projected usage of the printing device will likely not deplete the current cartridge prior to anticipated arrival of the replacement cartridge if the printing device exited the reduced print material usage mode; and
    responsive to determining that the projected usage will likely not deplete the current cartridge prior to the anticipated arrival of the replacement cartridge if the printing device exited the reduced print material usage mode, causing, by the processor, the printing device to exit the reduced print material usage mode.

7. The method of claim 1, further comprising, after the printing device has entered the reduced print material usage mode:
    determining, by the processor, whether the projected usage of the printing device will still likely deplete the current cartridge prior to anticipated arrival of the replacement cartridge; and
    responsive to determining that the projected usage will still likely deplete the current cartridge prior to the anticipated arrival of the replacement cartridge, causing, by the processor, the printing device to enter a more aggressive reduced print material usage mode.

8. The method of claim 1, wherein the printing device remains in the reduced print material usage mode until the current cartridge has been replaced with the replacement cartridge.

9. The method of claim 1, wherein the printing device remains in the reduced print material usage mode for a specified length of time and/or for a specified number of print jobs.

10. The method of claim 1, further comprising, after the printing device has entered the reduced print material usage mode:
    continually updating, by the processor, the projected usage of the printing device based on actual usage of the printing device; and
    continually monitoring the anticipated arrival of the replacement cartridge.

11. The method of claim 1, wherein entry of the printing device into the reduced print material usage mode occurs without end user notification,
    and wherein exit of the printing device from the reduced print material usage mode cannot be end user initiated.

12. The method of claim 1, wherein entry of the printing device into the reduced print material usage mode occurs with end user notification and approval.

13. The method of claim 1, wherein the processor is part of the printing device, or part of a computing device communicatively connected to the printing device over a network.

14. A non-transitory computer-readable data storage medium storing program code executable by a processor to perform processing comprising:
   as a printing device prints print jobs using print material from a current cartridge, receiving print material usage information regarding the print jobs;
   upon fulfillment of a replacement cartridge of print material that is to replace the current cartridge in the printing device, determining projected usage of the print material from the current cartridge in the future, based on the received print material usage information; and
   responsive to determining that the projected usage will likely deplete the current cartridge prior to anticipated arrival of the replacement cartridge such that the replacement cartridge will likely not have arrived and be unavailable to replace the current cartridge in the printing device when the current cartridge is depleted, instructing the printing device to enter a reduced print material usage mode in printing subsequent print jobs to use less print material from the current cartridge when printing the subsequent print jobs to reduce a likelihood that the current cartridge will be depleted before the replacement cartridge does arrive.

15. A printing device comprising:
   network hardware to communicatively connect to a computing device over a network:
   printing hardware to print jobs using print material from a current cartridge; and
   logic hardware to:
      send print material usage information regarding the print jobs to the computing device;
      receive instruction from the computing device to enter a reduced print material usage mode, responsive to determination, at fulfillment of a replacement cartridge that is to replace the current cartridge in the printing device, that projected usage in the future will likely deplete the current cartridge prior to anticipated arrival of a replacement cartridge such that the replacement cartridge will likely have not arrived and be unavailable to replace the current cartridge in the printing device when the current cartridge is depleted; and
   responsively cause the printing hardware to print subsequent print jobs in the reduced print material usage mode to use less print material from the current cartridge when printing the subsequent print jobs to reduce a likelihood that the current cartridge will be depleted before the replacement cartridge does arrive.

* * * * *